US009773253B2

(12) United States Patent
Nikolayev et al.

(10) Patent No.: US 9,773,253 B2
(45) Date of Patent: *Sep. 26, 2017

(54) EXTERNAL FEATURE INTEGRATION SYSTEM AND METHOD

(71) Applicants: Ilya Nikolayev, New York, NY (US); Georgi Darakev, Forest Hills, NY (US); Andrew P. Merkatz, New York, NY (US)

(72) Inventors: Ilya Nikolayev, New York, NY (US); Georgi Darakev, Forest Hills, NY (US); Andrew P. Merkatz, New York, NY (US)

( * ) Notice: Subject to any disclaimer, the term of this patent is extended or adjusted under 35 U.S.C. 154(b) by 735 days.

This patent is subject to a terminal disclaimer.

(21) Appl. No.: 14/027,150

(22) Filed: Sep. 13, 2013

(65) Prior Publication Data
US 2015/0081535 A1 Mar. 19, 2015

(51) Int. Cl.
*G06Q 30/02* (2012.01)
*A63F 13/00* (2014.01)
*G06Q 20/14* (2012.01)
*G06F 17/30* (2006.01)
(Continued)

(52) U.S. Cl.
CPC ......... *G06Q 30/0209* (2013.01); *A63F 13/00* (2013.01); *G06F 17/30* (2013.01); *G06Q 20/14* (2013.01); *G07F 17/3225* (2013.01); *G07F 17/3258* (2013.01); *G07F 19/211* (2013.01);
(Continued)

(58) Field of Classification Search
CPC ........ G06F 3/0481; G06F 21/00; G06F 9/541; G06F 3/04883; G06F 21/36; G06F 12/121; G06F 17/30867; G06C 20/102; G06C 20/14; G06C 30/00; G06C 30/0209; G07F 17/32; G07F 17/3225; G07F 17/3281; H04L 9/00; H04L 9/0866; H04L 9/3242; H04L 63/123; H04L 63/0428; H04M 1/66; H04M 1/67; H04M 1/7253;
(Continued)

(56) References Cited

U.S. PATENT DOCUMENTS 7,549,923 B2 6/2009 Abe et al.
8,725,113 B2 * 5/2014 Gargi ...................... H04M 1/67
380/247

(Continued)

*Primary Examiner* — Thanhnga B Truong
(74) *Attorney, Agent, or Firm* — Jackson Walker L.L.P.; Christopher J. Rourk

(57) ABSTRACT

A system for providing a predetermined set of functionality to primary applications is provided. The system includes a primary application interface that receives a user identifier, primary application configuration data and an application identifier associated with one of the primary applications from a plurality of primary applications, wherein the user identifier and the application identifier for each of the primary applications are different. A feature functionality system alters one or more features to match the primary application, the feature functionality system configured to provide a feature to a user associated with the user identifier and to transfer a primary application currency amount to the primary application or to award the user a prize upon completion of the feature by the user. A billing system interface unlocks external feature functionality for a certain number of interactions or a certain time period or generates the primary application currency amount.

19 Claims, 2 Drawing Sheets

(51) Int. Cl.
*G07F 17/32* (2006.01)
*G07F 19/00* (2006.01)

(52) U.S. Cl.
CPC . *A63F 2300/5513* (2013.01); *A63F 2300/609* (2013.01)

(58) Field of Classification Search
CPC ... H04M 2250/02; G06Q 20/14; G06Q 30/00; G06Q 30/0209
USPC ...... 726/17, 26; 715/746, 863; 707/999.002, 707/999.004, 999.005, 999.006, 999, 707/E17.109; 705/51, 52; 375/E7.009; 725/24
See application file for complete search history.

(56) References Cited

U.S. PATENT DOCUMENTS

| | | | |
|---|---|---|---|
| 2001/0010045 A1* | 7/2001 | Stefik | G06F 21/10 705/51 |
| 2009/0024933 A1 | 1/2009 | Smedley et al. | |
| 2009/0292640 A1 | 11/2009 | Heatherly | |
| 2010/0005424 A1 | 1/2010 | Sundaresan et al. | |
| 2012/0066767 A1* | 3/2012 | Vimpari | H04L 9/0866 726/26 |
| 2013/0014153 A1* | 1/2013 | Bhatia | H04N 21/252 725/24 |

* cited by examiner

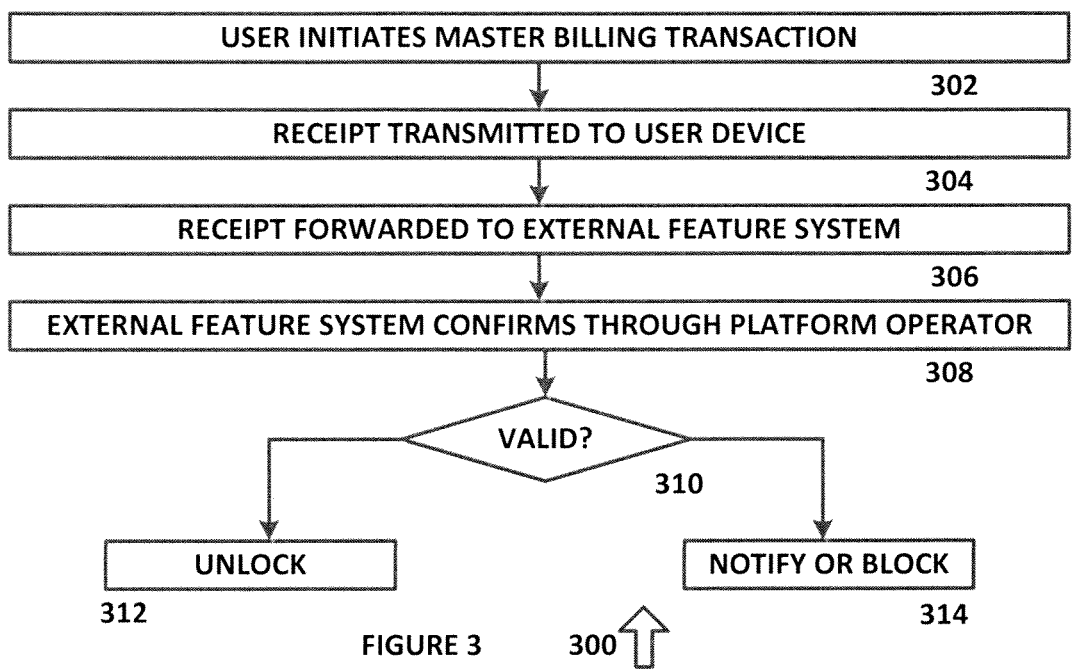

EXTERNAL FEATURE INTEGRATION SYSTEM AND METHOD

TECHNICAL FIELD

The present application relates generally to systems integration, and more specifically to an external feature integration system and method that allows a plurality of applications to utilize common external features.

BACKGROUND OF THE INVENTION

An application generally refers to defined, self-contained software code that provides predetermined functions. For example, Microsoft Word and Adobe Acrobat are two applications that are used to provide word processing and document display functionality. When a user wants to provide or utilize functionality that is not provided as part of the application, the user must typically import data from another application that provides that functionality. Similarly, when an application developer wants to provide functionality that is not part of the application, without the availability of third party tools, the developer itself must build this functionality.

SUMMARY OF THE INVENTION

A system for providing a predetermined set of functionality to a plurality of primary applications is provided. The system includes a primary application interface operating on a processor and configured to receive a user identifier, primary application configuration data and an application identifier associated with one of the primary applications from any one of the plurality of primary applications, wherein the user identifier and the application identifier for each of the primary applications are different. A feature functionality system operating on the processor and configured to alter one or more features to match the primary application, the feature functionality system configured to provide a feature to a user associated with the user identifier and to transfer a primary application currency amount to the primary application upon completion of the feature by the user. A billing system interface operating on the processor and configured to unlock certain feature functionality or generate the primary application currency amount.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 3 is a diagram of an algorithm for processing a transaction to provide an external feature in accordance with an exemplary embodiment of the present disclosure.

DETAILED DESCRIPTION OF THE INVENTION

Figure 1:
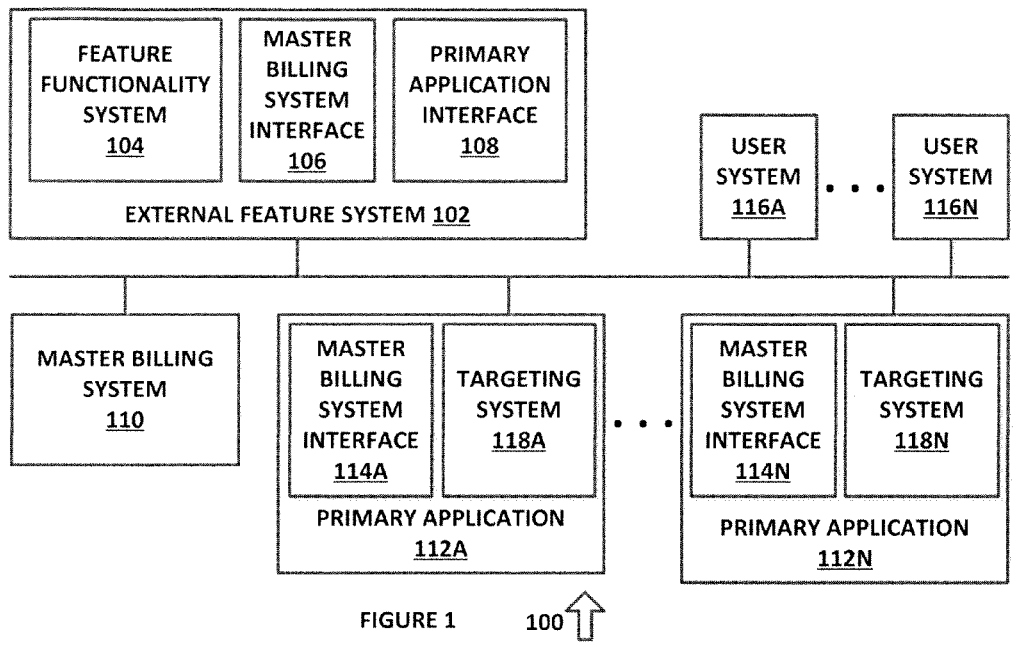
FIG. 1 is a diagram of a system for providing external feature integration in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for providing external feature integration in accordance with an exemplary embodiment of the present disclosure. System 100 can be implemented in hardware or a suitable combination of hardware and software, and can be two or more software systems operating on two or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as touchscreens, keyboards or mice, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

System 100 includes external feature system 102, which can be used to provide functionality for a plurality of primary applications 112A through 112N. In one exemplary embodiment, external feature system 102 can provide a game or games that can be accessed by user systems 116A through 116N which can each access one or more of primary applications 112A through 112N, can provide payment functionality, can provide print functionality, can allow the user to purchase an item or arrange for shipping, or can provide other suitable functionality to those users. In this exemplary embodiment, a user can be using a primary application 112A to play a game, and can be provided with a "mini-game" such as a slots game or a scratch-off game using external feature system 102, in order to win additional in-game currency or to win a prize. In one exemplary embodiment, the prize can be an in-game prize, such as weapons, vehicles or items other than in-game currency. In another exemplary embodiment, the prize can be a physical prize, such as a vehicle, a travel package or other goods or services, where the user has to complete additional steps, either within or outside of external feature system 102, in order to obtain the prize. In another exemplary embodiment, the prize can be a progressive jackpot that is provided to players of a plurality of different games through different primary applications 112A through 112N, where the primary applications 112A through 112N can share a common in-game currency, where the progressive jackpot is awarded in actual currency or translated to in-game currency, or in other suitable manners. External feature system 102 seamlessly interfaces with the primary application 112A through 112N that the user system 116A through 116N is interfacing with, such as by receiving a primary application identifier and access key that has been provided by the operator of external feature system 102 to the operator of primary application 112A through 112N, a user identifier for the user of primary application 112A through 112N and other suitable data. The user can then access the feature functionality of external feature system 102 with the associated user system 116A through 116N, such as to play a game to win in-game currency that can be used in the primary application, and the amount of the in-game currency that is won or remaining can be transferred from external feature system 102 to the primary application 112A through 112N that the user system 116A through 116N was originally accessing. Likewise, the user can purchase access to certain functionality so as to play the mini-game or can purchase in-game currency, access to different functionality can be based on different prices for that functionality, or other suitable price and functionality controls can be used. The billing transaction can be processed by the user through master billing system interface 114A, which can be an in application purchase item offered by a platform operator and associated with primary application 112A. In this exemplary embodiment, funds are distributed from the platform operator to primary application 112A and then to external feature system 102, such as based on a pre-existing contractual relationship between the operator of external feature system 102 and the primary application 112A. Likewise, the user can use master billing system interface 106, which can be an in application purchase under the control of external feature system 102. In this exemplary embodiment, funds are distributed from the platform operator to external feature system 102 and then to primary application 112A, such as based on a pre-existing contractual relationship between the operator of external feature system 102 and the primary application 112A.

In another exemplary embodiment, a user can order a product from a primary application 112A through 112N, and can arrange for payment or shipping through external feature system 102, such as where the operator of external feature system 102 has the ability to process online payment transactions or to schedule shipping. In further exemplary embodiments, a user can order a print or digital copy of an image or document from a primary application 112A through 112N, can purchase a security or commodity, can place an order for food delivery, can purchase a ticket to an event, or can perform other functions through an external feature system 102, where the external feature system 102 is able to transfer primary application credits or virtual currency back to the primary application 112A through 112N that the user was initially using, where the primary application functionality or credits can be purchased with real currency, and further, where the real currency that external feature system 102 obtains from the user or that primary application 112A obtains from the user is allocated between the external feature system 102 and the primary application 112A through 112N through a master billing system 110 or in other suitable manners.

Master billing system interface 106, master billing system interfaces 114A through 114N and master billing system 110 coordinate, in whole or in part, to allow a user to purchase functionality or virtual currency in feature functionality system 104 for use in primary applications 112A through 112N while the user is interfacing with external feature system 102. The real currency that is used to purchase or unlock this functionality or virtual currency is allocated between external feature system 102 and the associated primary application 112A through 112N. In one exemplary embodiment, when the user is transferred to external feature system 102 from a primary application 112A through 112N, the transfer can include an account balance in the currency of the originating primary application 112A through 112N, a currency conversion factor (such as the number of units of primary application currency that can be won when the user engages with external feature system 102), a web skin or other graphical or audio data that can be used to configure external feature system 102 to the user to maintain the appearance that the user is still operating in the primary application, or other suitable conversion data. The user can then win primary application currency in external feature system 102, can purchase feature functionality or additional primary application currency, and can have the primary application currency transferred back to the primary application. Likewise, the primary application currency won can be limited by external feature system 102, such as where a limited amount of primary application currency that can be acquired by each user is identified in advance so as to give the primary application some control over potential winnings. In this exemplary embodiment, external feature system 102 can be used by primary applications 112A through 112N to provide additional features that are made available to users of the primary application, such as a scratch off game or slot wheel game, so that the user can have the chance to win additional in-game currency, but where the user does not buy access to the feature functionality or any in-game currency while using external feature system 102. In this exemplary embodiment, access to external feature system 102 is provided in order to supplement the user experience or to motivate the user to engage with the functionality on a paid basis after trying out the free version.

Primary application interface 108 is configured to recognize and process the primary application identifier, access key, user identifier, web skin, audio and graphical attributes and other suitable data from each of the plurality of primary applications 112A through 112N and to apply that data to processes of external feature system 102. For example, while the primary application identifier and access key format may be specified by the operator of external feature system 102, the user identifier, audio and graphical attributes and other data will typically be unique for each primary application, although some common features may exist between certain classes of primary applications. External feature system 102 is configured to use the data that is provided by each of the primary applications 112A through 112N, such as by using suitable variable identifiers, by translating data for each primary application between a common format and an application-specific format, or in other suitable manners, in order to provide a seamless user experience to the users of primary applications 112A through 112N. For example, external feature system 102 can be configured so that a user will not notice a change in the user identifier, currency type, visual appearance, audio background music or other features that would be apparent to the user.

Targeting systems 118A through 118N control targeting, including frequency, of a user interface feature for transferring control from the associated primary application 112A through 112N to external feature system 102. In one exemplary embodiment, a user of one of primary applications 112A through 112N can be presented with the opportunity to play a mini-game at predetermined times (such as once a day), after predetermined events, if the user has been identified as part of a certain demographic or in other suitable manners. Targeting systems 118A through 118N allow the operators of primary applications 112A through 112N to select different targeting criteria, including frequency, based on the objectives of primary applications 112A through 112N in providing access to external feature system 102. Also or alternatively, additional display targeting control can be provided centrally from external feature system 102 or in other suitable manners.

In operation, system 100 allows a plurality of primary applications 112A through 112N to offer external feature functionality, such as mini-games, purchasing, shipping or other suitable functionality, and for primary application currency for each of the different primary applications to be won. For example, a first primary application can be a first game that has a game currency of gems, and a second primary application can be a second game that has a game currency of coins. System 100 allows the two different primary application games to offer mini-games to their users, where the mini-games are provided by external feature system 102. External feature system 102 can receive user account data, in-game currency data and other suitable data and can allow the users of the different primary applications to win additional in-game currency as a function of the feature functionality system and to transfer those winnings back to the primary applications. Likewise, access to the feature functionality system or in-game currency for each different primary application can be purchased through external feature system 102, functions such as purchasing or printing can be provided, or other suitable functions or features can be provided.

Figure 2:
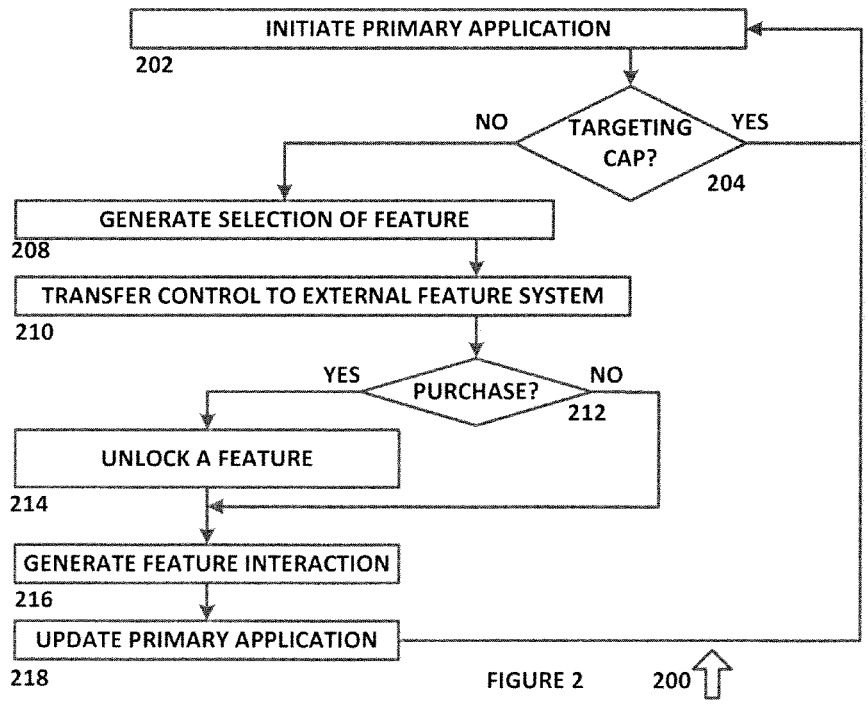
FIG. 2 is a diagram of an algorithm for providing external feature integration in accordance with an exemplary embodiment of the present disclosure.

FIG. 2 is a diagram of an algorithm 200 for providing external feature integration in accordance with an exemplary embodiment of the present disclosure. Algorithm 200 can be implemented in hardware or a suitable combination of hardware and software, and can be one or more algorithms operating on a processor.

Algorithm 200 begins at 202, where a user initiates a primary application using a user interface control or in other suitable manners. In one exemplary embodiment, a user can access a primary application using a processor, such as a laptop computer, a desktop computer, a smart phone, a tablet, or other suitable devices. The primary application can be a web-enabled application, a thin client application, a full-featured application or other suitable applications. The primary application can include one or more controls to allow the user to select an external application, such as an icon that triggers the external application, or the external application can be triggered automatically, such as by being linked to a zone within the primary application. In this exemplary embodiment, a web-enabled primary application can be accessed through a browser, and can include one or more user-selectable objects such as icons associated with the external application, where the object or objects each have associated functional, graphic and data attributes that allow the user to activate the external application within the operating regime of the primary application. Likewise, the external application can be linked to a specific zone or page within the primary application, such that navigating to that zone triggers the external application without any further user action. The algorithm then proceeds to 204.

At 204, it is determined whether targeting for the external application allows the application to be triggered. In one exemplary embodiment, a user can try to activate an external application using the user-selectable user interface control a predetermined number of times a day, after a predetermined number of events (such as an initial log-on event to the primary application), or in other suitable manners, and the allowable number of such activations can be controlled. In another exemplary embodiment, the generation of the user-selectable user interface control can be limited based on frequency, or other suitable processes or procedures can be used to control access to the external application. If it is determined that targeting criteria prevents the external application from being activated, the algorithm returns to 202, otherwise the algorithm proceeds to 208.

The algorithm then proceeds to 208, where the feature selection is generated, such as by a user interfacing with a user interface control, without user input such as the external application being linked to a primary application zone, or in other suitable manners. The algorithm then proceeds to 210.

At 210, control is transferred to an external feature system. In one exemplary embodiment, a user application such as a web browser or other suitable applications can be provided with a network address for the external feature system, the external feature system can be provided with an application identifier for the primary application, or other suitable processes can also or alternatively be used. In addition, user account information can also be provided by the primary application to the external feature system, such as a user identifier, an account balance, purchase information, or other suitable data. The algorithm then proceeds to 212.

At 212, it is determined whether a purchase process is to be performed. In one exemplary embodiment, a purchase can include unlocking a feature within the external feature system for some amount of interactions, an exchange of real currency for game currency, payment for shipping or goods, or other suitable purchases. If it is determined that a purchase process does not need to be performed, the algorithm proceeds to 216. If it is determined that a purchase is to be performed, the algorithm proceeds to 214, where the purchase amount unlocks a feature within the external feature system for some amount of interactions, provides the user with additional primary application currency, or other suitable procedures are performed, such as payment for shipping or goods. The algorithm then proceeds to 216.

At 216, the feature interaction is generated. In one exemplary embodiment, the feature interaction can include playing a mini-game, such as a predetermined number of pulls of a virtual slot machine handle, a predetermined number of scratch off game plays, or other suitable mini-games. The algorithm then proceeds to 218.

At 218, data is transmitted from the external feature system to the primary application, such as data that identifies the user, the primary application currency that the user has been awarded, or other suitable data. Likewise, where algorithm 200 is used to provide other functionality to a plurality of primary applications, that functionality can be provided. At the completion of the functionality, the algorithm returns to 202.

In operation, algorithm 200 allows a feature to be provided for a plurality of primary applications by a single external application. Algorithm 200 allows a primary application to transmit data to the external application to configure the external application for use by the user and to provide a seamless integration into the primary application, such as by configuring the external application for the user by setting an in-game currency name or amount, by incorporating a web skin or other visual or audio components into the external application, or in other suitable manners. The user can also perform purchases while in the external application, and transfer of primary application currency can also be performed.

FIG. 3 is a diagram of an algorithm 300 for processing a transaction to provide an external feature in accordance with an exemplary embodiment of the present disclosure. Algorithm 300 can be implemented in hardware or a suitable combination of hardware and software, and can be one or more algorithms operating on a processor.

Algorithm 300 begins at 302 where a user initiates a transaction using a primary application master billing system interface. In one exemplary embodiment, the user can select activation of an external feature through a primary application, and can initiate a purchase transaction for the external feature through the external feature system that utilizes the primary application's master billing system interface. Likewise, other suitable configurations can also or alternatively be used. The algorithm then proceeds to 304.

At 304, the receipt for the purchase is received from the master billing system at the user device. In one exemplary embodiment, the receipt can be transmitted using the software development kit of the platform operator, the receipt can be received at the user device from the primary application, or other suitable processes can also or alternatively be used. The algorithm then proceeds to 306.

At 306, the receipt for the purchase is sent to the external feature system. In one exemplary embodiment, the interface between the device and the external feature system can be configured to receive or retrieve the receipt from the device, the master billing system or other suitable systems and to forward the receipt data to the external feature system. Likewise, the user can be prompted to authorize transmission of the receipt data, or other suitable processes can also or alternatively be used. The algorithm then proceeds to 308.

At 308, the external feature system confirms the validity of the receipt with the platform operator, master billing system, the primary application or in other suitable manners. In one exemplary embodiment, the external feature system can send a verification request to the platform operator with the receipt data, and the platform operator can independently verify the receipt data. Other suitable processes can also or alternatively be used. The algorithm then proceeds to 310.

At 310, it is determined whether validity has been confirmed. If the validity has been confirmed, then the algorithm proceeds to 312 where the functionality of the external feature is unlocked, such as by allowing the user to obtain extra plays of a mini-game or other suitable functionality. If it is determined that the validity has not been confirmed, the algorithm proceeds to 314, where the user is notified that there has been a problem encountered with the purchase, the operator of the external feature system or other persons are notified of attempted fraud, the user device is blocked from using the external feature or other suitable processes are performed.

In operation, algorithm 300 allows a user to initiate a billing transaction for functionality obtained through an external feature system using available billing processes, such as through a third party platform operator (such as Apple or Google) or in other suitable manners.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for providing a predetermined set of functionality to a plurality of primary applications, comprising:
a primary application interface operating on a processor and configured to receive a user identifier, primary application configuration data, and an application identifier associated with one of the primary applications from any one of the plurality of primary applications, wherein the user identifier and/or the application identifier for each of the primary applications are different;
a feature functionality system operating on the processor and configured to alter one or more features of a secondary application to match the primary application as a function of the user identifier, the primary application configuration data and the application identifier, the feature functionality system configured to provide an executable feature to a user associated with the user identifier with the altered secondary application and to transfer a primary application currency amount to the primary application upon execution of the feature by the user; and
a billing system interface operating on the processor and configured to unlock functionality of the executable feature for a certain number of interactions or a certain time period, wherein the billing system is configured to provide receipt data to the feature functionality system, and the feature functionality system is configured to validate the receipt data with the platform operator.

2. The system of claim 1 wherein the feature functionality system is configured to provide an award, including a virtual award, to the user.

3. The system of claim 1 wherein the feature functionality system is comprised of one or more mini-games.

4. The system of claim 1 wherein the billing system is configured to generate primary application currency.

5. The system of claim 1, wherein a common in-game currency is provided for a plurality of primary applications.

6. The system of claim 1, wherein a progressive jackpot is provided for a plurality of primary applications.

7. The system of claim 1, wherein the feature functionality system is configured to modify its functionality as a function of the primary application.

8. The system of claim 1, wherein the feature functionality system is configured to modify one or more visual elements as a function of the primary application.

9. The system of claim 1, wherein the feature functionality system is activated on a user device by activation of a user control on the user device.

10. The system of claim 1, wherein the feature functionality system is automatically initiated by an action of one of the primary applications.

11. The system of claim 1, wherein the billing system is configured to allow a user to select multiple price points that provide varying levels of access to the feature functionality system.

12. The system of claim 1, wherein the billing system is configured to utilize a billing system of one of the primary applications.

13. The system of claim 1, wherein the billing system is configured to utilize a mobile platform billing system.

14. The system of claim 1, wherein advertisements are delivered within the feature functionality system.

15. A method for providing a predetermined set of functionality to a plurality of primary applications, comprising:
receiving a user identifier, primary application configuration data and an application identifier associated with one of the primary applications at a first processor from any one of the plurality of primary applications, wherein each of the plurality of primary applications operates on an associated second processor, and wherein the user identifier and the application identifier for each of the primary applications are different;
altering one or more features of a secondary application with the first processor to match the primary application as a function of the user identifier, the primary application configuration data and the application data to create a modified secondary application;
providing the modified secondary application to the one of the second processors associated with the one of the primary applications, for use by a user associated with the user identifier;
transferring a primary application currency amount to the primary application upon completion of the secondary application by the user;
providing receipt data to the first processor and validating the receipt data with the secondary application; and
unlocking the secondary application functionality for a certain number of interactions or a certain time period.

16. The method of claim 15 further comprising providing an award to the user.

17. The method of claim 15 further comprising providing one or more minigames to the user.

18. The method of claim 15 further comprising generating primary application currency.

19. In a system for providing a predetermined set of functionality to a plurality of primary applications, comprising a primary application interface operating on a processor and configured to receive a user identifier, primary application configuration data, and an application identifier associated with one of the primary applications from any one of the plurality of primary applications, wherein the user identifier and the application identifier for each of the primary applications are different, a feature functionality system operating on the processor and configured to alter one or more features to match the primary application as a function of the user identifier, the primary application configuration data and the application identifier, the feature functionality system configured to provide an executable feature to a user associated with the user identifier and to transfer a primary application currency amount to the primary application upon execution of the feature by the user and a billing system interface operating on the processor and configured to unlock functionality of the executable feature for a certain number of interactions or a certain time period, wherein the feature functionality system is configured to provide an award, including a virtual award, to the user, wherein the feature functionality system is comprised of one or more mini-games, wherein the billing system is configured to generate primary application currency, wherein a common in-game currency is provided for a plurality of primary applications, wherein a progressive jackpot is provided for a plurality of primary applications, wherein the feature functionality system is configured to modify its functionality as a function of the primary application, wherein the feature functionality system is configured to modify one or more visual elements as a function of the primary application, wherein the feature functionality system is activated on a user device by activation of a user control on the user device, wherein the feature functionality system is automatically initiated by an action of one of the primary applications, wherein the billing system is configured to allow a user to select multiple price points that provide varying levels of access to the feature functionality system, wherein the billing system is configured to utilize a billing system of one of the primary applications, wherein the billing system is configured to utilize a mobile platform billing system, wherein the billing system is configured to provide receipt data to the feature functionality system, and the feature functionality system is configured to validate the receipt data with the platform operator, and wherein advertisements are delivered within the feature functionality system, a method for providing a predetermined set of functionality to a plurality of primary applications, comprising:
receiving the user identifier, the primary application configuration data and the application identifier associated with one of the primary applications from any one of the plurality of primary applications, wherein the user identifier and the application identifier for each of the primary applications are different;
altering one or more features of the secondary application to match the primary application as a function of the user identifier, the primary application configuration data and the application data;
providing the secondary application to the user associated with the user identifier;
transferring the primary application currency amount to the primary application upon completion of the secondary application by the user;
unlocking the secondary application functionality for a certain number of interactions or a certain time period;
providing an award to the user;
providing one or more minigames to the user; and
generating primary application currency.

* * * * *